(12) United States Patent
Chang et al.

(10) Patent No.: US 11,231,384 B2
(45) Date of Patent: Jan. 25, 2022

(54) HUMIDITY SENSOR

(71) Applicant: BIOCONN CORPORATION, Taichung (TW)

(72) Inventors: Kuo Chung Chang, Taichung (TW); Guo Cai Huang, Taichung (TW); Po-Feng Lee, Taichung (TW); Mei-Yen Fang, Taichung (TW)

(73) Assignee: BIOCONN CORPORATION, Taichung (TW)

( * ) Notice: Subject to any disclaimer, the term of this patent is extended or adjusted under 35 U.S.C. 154(b) by 210 days.

(21) Appl. No.: 16/285,660

(22) Filed: Feb. 26, 2019

(65) Prior Publication Data
US 2019/0302048 A1    Oct. 3, 2019

(30) Foreign Application Priority Data

| Apr. 2, 2018 | (TW) | 107111670 |
| Apr. 2, 2018 | (TW) | 107204339 |
| Jul. 30, 2018 | (TW) | 107210375 |
| Sep. 28, 2018 | (CN) | 201811135839.0 |
| Sep. 28, 2018 | (CN) | 201821586410.9 |
| Sep. 28, 2018 | (CN) | 201821589299.9 |
| Sep. 28, 2018 | (CN) | 201821589423.1 |

(51) Int. Cl.
*G01N 27/22* (2006.01)
*G01N 27/12* (2006.01)

(52) U.S. Cl.
CPC ........ *G01N 27/225* (2013.01); *G01N 27/121* (2013.01); *G01N 27/227* (2013.01)

(58) Field of Classification Search
CPC ... G01N 27/225; G01N 27/227; G01N 27/121
See application file for complete search history.

(56) References Cited

U.S. PATENT DOCUMENTS

| 2006/0244614 | A1* | 11/2006 | Long | A61F 13/42 340/573.5 |
| 2011/0179861 | A1* | 7/2011 | Grange | H01G 5/0136 73/335.04 |
| 2014/0296808 | A1* | 10/2014 | Curran | G01N 27/225 604/361 |

* cited by examiner

*Primary Examiner* — Xin Y Zhong
(74) *Attorney, Agent, or Firm* — NZ Carr Law Office PLLC

(57) ABSTRACT

The present invention provides a humidity sensor, comprising a substrate having a coating wire and at least one humidity detecting portion S, each humidity detecting portion S comprises at least two electrodes, and each of electrodes is connected to their respective coating wires, and an electrochemical medium which is electrically insulated when dry and conductive when wet is provided between electrodes. This kind of humidity sensors can be used to monitor humidity in a highly sensitive manner, especially monitor the amount and extent of urine.

20 Claims, 12 Drawing Sheets

HUMIDITY SENSOR

RELATED APPLICATION

This application claims priority to China Taiwan's Patent Application No. 107111670, filed on Apr. 2, 2018, and Application No. 107204339, filed on Apr. 2, 2018. This application also claims priority to China Taiwan's Patent Application No. 107210375, filed on Jul. 30, 2018.

This application claims priority to Chinese Patent Application No. 2018111358390, filed on Sep. 28, 2018, Application No. 2018215894231, filed on Sep. 28, 2018, Application No. 2018215892999, filed on Sep. 28, 2018, and application No. 2018215864109, filed on Sep. 28, 2018. The disclosure of each application is incorporated herein by reference in its entirety.

FIELD OF THE INVENTION

The present invention relates to humidity sensing, in particular to a moisture absorption type humidity sensing module and a humidity sensing strip having the module.

BACKGROUND OF THE INVENTION

A humidity sensor is a device or an apparatus that converts the amount of humidity into electrical signals that are easily processed and measured. The common humidity sensor is generally used to measure the relative humidity in an environment. In some cases, the common humidity sensors cannot be used directly to measure the humidity in absorbent articles such as diapers, training pants, incontinence products, feminine hygiene products and swimming underwear, etc.

Currently, various types of moisture or humidity indicators have been used in absorbent articles. The patent ZL201180075983.X discloses an absorbent article incorporating a liquid drain sensor comprising an electrically insulating back sheet having an absorbent core and a liquid drain sensor on the body side, and having at least one hole to allow at least one liquid drain sensor to be in communication with the absorbent core. The liquid drain sensor has a plurality of conductive lines, each of the conductive lines is partially exposed by the at least one hole, the liquid drains enter the absorbent core from the hole, and when the absorbent cores between the two conductive lines changes from a dry state to a wet state, the liquid drain sensor outputs an electrical signal; the back sheet is provided with a plurality of holes, each of which is longitudinally spaced from the other holes, wherein a longitudinal axis extends along the direction from the front to the back of the absorbent article.

The liquid drain sensor for detecting the humidity range in the absorbent article has the following drawbacks: first, it is built in an absorbent article (such as a diaper, a diaper, a training pants, etc.) and must be manufactured together with the absorbent article, and it cannot be used in other absorbent articles; second, after the liquid is absorbed by the absorbent core, the conductive wire of the liquid drain sensor is turned on by wet absorbent core to output an electrical signal. When the wettability of the absorbent core is insufficient and the adjacent conductive wire is turned on, the liquid drain sensor cannot output electrical signals, and the liquid drain sensor has a low sensitivity; third, the liquid drain sensor has a metal conductive wire, which is integrated into diapers and incontinence products, etc., with hidden dangers of harming users by broken metal wires, moreover, metal wires are expensive, and people will feel strong foreign body sensation and discomforts when close to a human body.

Thus, it is required to improve the prior art and provide a superior wet detection device or sensor.

SUMMARY OF THE INVENTION

It is an object of the present invention to provide a humidity sensor that can be used with any absorbent core without metal wires.

A humidity sensor, comprising an insulator substrate having a coating wire and at least one humidity detecting portion S, each humidity detecting portion S comprises at least two electrodes, and each of electrodes is connected to their respective coating wires, and an electrochemical medium which is electrically insulated when dry and conductive when wet is provided between electrodes.

In some preferred embodiments, a coating wire is a conductive wire which is disposed on the substrate by printing or coating with a conductive adhesive (such as conductive silver adhesive, conductive carbon adhesive) or biochemical ink. In this way, once the place of the electrochemical medium on the base layer is wetted, a current conduction can be formed between the electrodes, thereby current conduction occurs on the wires connected to the electrodes.

In some embodiments, the substrate is a hygroscopic material. When used, the substrate is fixed on the surface of the absorbent article, and the humidity sensor is directly in contact with the human body; when the liquid substance appears, the liquid is directly in contact with the electrochemical medium on the humidity sensor by passing through the hygroscopic material or the liquid, and the electrochemical medium is wetted, thereby conducting the current, indicating that the portion is wetted and absorbed by the absorbent article. The electrochemical medium of humidity detecting portion wetted by liquid is changed from an insulator to a conductor, and the electrodes change from an open circuit to a short circuit to output an electrical signal, indicating that the portion is wetted.

In some embodiments, when the substrate is wetted, the conductivity of the substance portion having the electrochemical medium is greater than the conductivity of the substrate, or the current conduction time of the substrate portion having the electrochemical medium is earlier than the current conduction time between the coating wires on the substrate.

In some embodiments, the substrate has a portion with an electrochemical medium and a portion without an electrochemical medium, wherein the conductivity of the portion without an electrochemical medium is less than the conductivity of the portion with an electrochemical medium when the substrate is wetted.

In some embodiments, the substrate has a portion with an electrochemical medium and a portion without an electrochemical medium, wherein the conductivity of the portion without an electrochemical medium is equal to the conductivity of the portion with an electrochemical medium when the substrate is dry.

In some embodiments, the substrate is an insulator. In some embodiments, the substrate is a material having wettability.

Humidity Detecting Portion

In some preferred embodiments, there are multiple humidity detecting portions, and each humidity detecting portion emits ON signals when turned on, and the plurality of humidity detecting portions emit accumulated ON signals when turned on. For example, the ON signal is a beep, and when only one humidity detecting portion is turned on, one beep sound is made within unit time; when two humidity detecting portions are turned on, two beep sounds are made within unit time; and when N humidity detecting portions are turned on, N beep sounds are made within unit time. Or, when one humidity detecting portion is turned on, beep sound of unit strength is made, and when N humidity detecting portions are turned on, beep sound of N* unit strength is made. The ON signal may also be an optical signal that is transmitted to the reminder signal light at the terminal. The amount of conduction of humidity detecting portion characterizes the amount of liquid and the range of humidity diffusion. In some embodiments, the humidity detecting portion is disposed at different positions on the substrate, to detect the wetness conditions at different positions.

Each coating wire connects at least one electrodes of a humidity detecting portion. When a plurality of humidity detecting portions are connected to the same coating wire, the electrochemical medium of the humidity detecting portion that is not wetted by the liquid is an insulator, and current exists only on the existing coating wire. The wire connected to another electrode of the humidity detecting portion that is not wetted by the liquid will not form a loop with the existing coating wire. Therefore, setting a plurality of humidity detecting portions on a coating wire will not cause signal interference and will save the area of the substrate.

In some preferred embodiments, each electrode includes a plate connected to a wire, the electrochemical medium is disposed between two plates (a part of the electrode), and the plate is a conductive adhesive coating (for example, a screen printed carbon adhesive layer or a silver adhesive layer, etc.). One of the plates in the humidity detecting portion is inside the other plate, the outer plate has a notch, and the inner plate and the connecting portion of its coating wire are located in the notch. The inner plate and the outer plate are both circular, and the connecting portion of the inner plate and the connecting portion of the outer plate are straight. The relative area between two plates is increased in an inclusion way, to enhance the sensitivity of the humidity detecting portion. Alternatively, the two plates of the humidity detecting portion are opposite. There are comb teeth distributed along the plate, and there is a slot between two adjacent comb teeth; and the comb teeth of two electrons are opposite to each other. In the humidity detecting portion, the comb teeth of one electrode are inserted to the slot of another electrode, and there is a slot between two adjacent comb teeth. A gap exists between two electrodes, and the gap between electrodes is filled by electrochemical medium. The comb teeth increase the sensing area of the electrode, as long as the electrochemical medium between a pair of combs among the two electrodes is wetted, electrical signals will be output, to enhance the sensitivity to humidity sensing. A portion of the coating wire is used as a plate, or the plate is partially overlapped with the coating wire, or the plate is located at the end of the coating wire, or the plate is connected to the end of the coating wire. As a preferred embodiment, the two electrodes are located on the same layer. The electrochemical medium partially or completely covers the electrodes. During manufacturing, the electrochemical medium solution is dripped to the humidity detecting portion, and then dried to make the electrochemical medium in an insulated state.

Alternatively, each humidity detecting portion comprises a pair of conductive segments, a moisture absorbing hole is disposed between the two conductive segments, and an electrochemical medium is filled in the moisture absorbing hole. The liquid enters the moisture absorbing hole, the electrochemical medium is changed from an insulator to a conductor, and the two conductive segments are turned on to output electrical signals.

Each conductive segment comprises a carbon adhesive layer and a silver adhesive layer, the conductive segment is applied to the substrate surface, and the silver adhesive layer is between the carbon adhesive layer and the substrate. One end of the conductive segment adjacent to the moisture absorbing hole is a first end, and the other end is a second end. The second end of the silver adhesive layer is wrapped in the carbon adhesive layer, both the second end of the silver adhesive layer and the second end of the carbon adhesive layer are exposed to the moisture absorbing hole. There is an electrochemical medium in the gap between the silver adhesive layer and the carbon adhesive layer. Alternatively, the silver adhesive layer is wrapped within the carbon adhesive layer.

The moisture absorbing hole is filled with an electrochemical medium having an overflow portion. The overflow portion of the electrochemical medium partially covers the two conductive segments. Both the carbon adhesive layer and the silver adhesive layer are involved in electric conduction, the carbon adhesive layer protects the silver adhesive layer, and the silver adhesive layer enhances the electrical signals. The electrochemical medium is filled in the moisture absorbing hole and penetrates into each gap exposed to the moisture absorbing hole, to increase the contact area between the electrochemical medium and the conductive segment, and enhance the sensitivity of the humidity detecting portion S.

Substrate

As a preferred embodiment, the substrate is a hygroscopic paper tape, for example, filter paper, rice paper, and straw fiber absorbent paper have good hygroscopicity, and papers that do not easily diffuse liquid can be used as the substrate.

As a preferred embodiment, the substrate is a strip-shaped absorbent paper of equal width, and the humidity detecting portion S is spaced apart along the longitudinal direction of the substrate.

As an embodiment, the substrate has at least one enlarged portion; the humidity detecting portions S are disposed on the enlarged portion separately along the width direction of the substrate.

As an embodiment, the substrate comprises a detection section and a signal connection section, the humidity detection portion S is disposed at the detection section, the signal input terminal is disposed at the signal connection section, and the detection section and the signal connection section have formed an angle. The detection section is orthogonal to the signal connection section. The substrate has at least one enlarged portions and the enlarged portions have one or a plurality of humidity detecting portions S.

A positioning hole is disposed on the substrate and the positioning hole is offset from the coating wire and the humidity detecting portion. During use, the humidity sensor needs to be connected to a connector that can input current to the humidity sensor. The positioning hole is used to match the connector to determine the correct position between the humidity sensor and the connector.

The front side of the substrate is provided with a coating wire, the back of the substrate is printed with a pattern, and the pattern is printed with a material that exhibits color in case of water. After the substrate absorbs the liquid, the patterns appear, having the aesthetic and indicating functions.

Coating Wire

As a preferred embodiment, there are multiple coating wires, without crossing between them. All coating wires are on the same layer, and there is no intersection between the coating wires, therefore, there is no signal interference.

There is a humidity detecting portion S between two adjacent coating wires. There is a humidity detecting portion S between the two outermost coating wires.

As a preferred embodiment, the coating wires extend along the direction of the length of substrate. The outermost two wires are respectively line segments parallel to the substrate. Each wire has a parallel segment parallel to the substrate. One end of the parallel segment is a signal terminal which is used to connect current. All coating wires from the first one to the last one are numbered by natural numbers, and there are humidity detecting portions S between adjacent odd-numbered wires, or there are humidity detecting portions S between adjacent even-numbered wires.

As an embodiment, the pattern formed by the coating wire has at least one enlarged region having one or more humidity detecting portions S. The humidity detecting portions S are disposed separately along the length direction or along the width direction of the substrate, or along the length direction and the width direction of the substrate. The enlarged region is provided with an enlarged portion on the substrate; or the substrate is a strip of equal width, and only the pattern formed by the coating wire has an enlarged region. The center of the enlarged region is provided with a humidity detecting portion S. The setting of the enlarged region is to expand the humidity detection range in the liquid concentrated area.

Adhesive Layer

As a preferred embodiment, a humidity sensor has an adhesive layer. The adhesive layer enables objects to attach to or adhere to any place where humidity sensing is required, for example, the adhesive layer is a self-adhesive layer. The coating wire is located between the adhesive layer and the substrate. The adhesive layer not only acts as an adhesive but also seals the coating wire and the electrochemical medium between the adhesive layer and the substrate. When in use, the liquid must pass through the substance to reach the humidity detecting portion S to prevent the electrode misleading and misjudgment of the amount of liquid caused by direct liquid access to the humidity detecting portion S without absorption by the substrate due to liquid fluidity. The electrochemical medium is above the electrode and the adhesive layer covers the electrochemical medium and electrode.

Release Sheet Layer

As a preferred embodiment, the adhesive layer is detachably attached with a release sheet layer. The release sheet layer is a resin film, which fully covers the substrate. A free separation segment is provided between the release sheet layer and the substrate. The adhesive layer covers the area of the substrate other than the free separation segment. The free separation segment may facilitate the separation of the release sheet layer from the substrate.

Humidity Sensor Coil

A humidity sensor coil comprises a plurality of humidity sensors, and the humidity sensors are sequentially arranged along the length direction. The head end of the first humidity sensor is a free end, and the tail end of the last humidity sensor is a free end, and the humidity sensors are wound into a coil in sequence from the first humidity sensor.

As a preferred embodiment, a separation mark is provided between two adjacent humidity sensors, and the separation mark is a crease, or a tear line, etc.

The coil includes a mandrel, and the head end of the first humidity sensor is fixed to the mandrel. The humidity sensor is accommodated around the mandrel. The tail end of the last humidity sensor has a fixture, to prevent the coil from loosening.

As a preferred embodiment, the humidity sensor in the coil comprises a substrate, a coating wire, a humidity detecting portion S and an electrochemical medium. During use, a humidity sensor is removed and then attached to the article to be tested by bonding or other ways.

As a preferred embodiment, the humidity sensor in the coil comprises a substrate, a coating wire, a humidity detecting portion S, an electrochemical medium, an adhesive layer, and a release sheet layer. During use, the humidity sensor is removed, and attached to the article to be tested by the adhesive layer after tearing off the release sheet layer.

A plurality of humidity sensor is stored in coils, to facilitate transportation, storage and receiving.

Humidity Sensor Strip

The humidity sensor coil comprises a plurality of humidity sensors, and the humidity sensors are sequentially arranged along the length direction. The head end of the first humidity sensor is a free end, and the tail end of the last humidity sensor is a free end, the adjacent front and rear humidity sensors are folded, and the fold location is the boundary of two humidity sensors. A plurality of humidity sensors are folded into the length of a humidity sensor for easy storage.

As a preferred embodiment, the boundary is a discontinuous tear line, to facilitate availableness of a single humidity sensor.

Beneficial Effects

1. The humidity sensor is an independent device, which can be used with any absorbent articles (such as diapers, raincoats, etc.). It has no requirements for the application objects and has wide applicability; in addition, the humidity sensor can be manufactured separately.

2. The use of coating wire rather than metal wire has no safety hazards, with low cost.

3. The substrate is paper tape, and the substrate is in direct contact with human body, with high detection sensitivity; moreover, the substrate is soft, and the coating wire will not increase the foreign body sensation of the substance, enhancing the comfort for human body.

4. The coating wire is packaged between the adhesive layer and the substrate. As the substrate contacts the human body and the substrate can separate the coating wire from human body, the current input into the coating wire will not flow through the human body, with high safety.

SYMBOL DESCRIPTION

Figure 1:
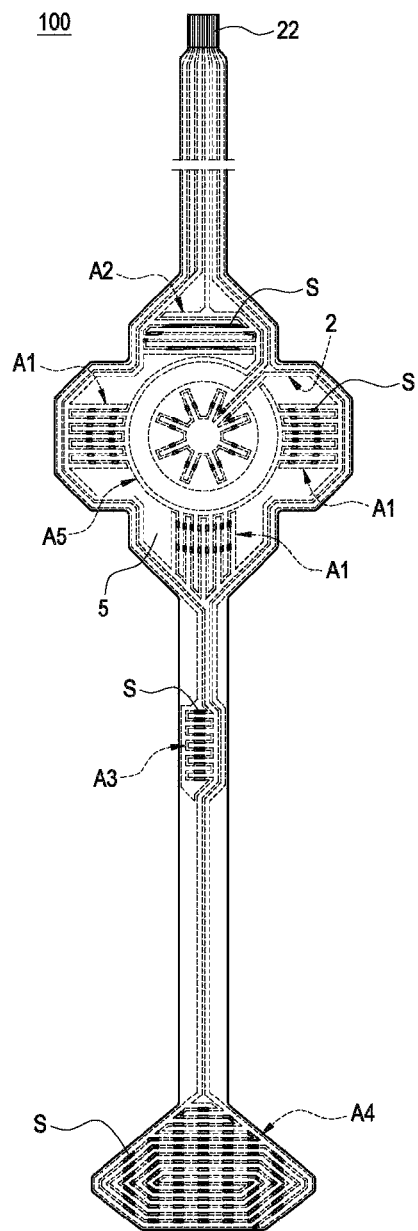
FIG. 1 is a planar perspective view of a humidity sensor according to Example 1 of the present invention (a release sheet layer is torn).

100. 100a . . . humidity sensor
   1 . . . substrate
      2 . . . Conductive silver adhesive layer
         21 . . . Conductive segment
            211 . . . moisture absorbing hole
         22 . . . connecting portion
            221 . . . connecting point
            222 . . . hole
   3 . . . protection layer
      3b . . . carbon adhesive layer
         31 . . . second notch
         32 . . . carbon adhesive portion
   4 . . . electrochemical medium
      41 . . . packing portion
      42 . . . span portion
   5 . . . adhesive layer
   6 . . . release sheet layer
   7 . . . receiver
      71 . . . electric connection structure
         711 . . . first structural member
         712 . . . second structural member
         713 . . . conductive terminal
         714 . . . first magnetic member
         715 . . . second magnetic member
         716 . . . caulking groove
         717 . . . stopper body
A1~A5 . . . First to fifth sensing areas with large area
S . . . humidity detecting portion S

DETAILED DESCRIPTION

Structures or technical terms used or referred to herein are further described below. Unless otherwise specified, they are understood and explained according to general terms in the art.

Humidity Detection

Humidity detection means to detect the amount of liquid or water vapor. The liquid includes but not limited to urine, liquid feces, blood, tissue fluid, secretions, saliva, purified water, rainwater, water formed by vapor condensation, and secretions or excretions formed by hot vapor on human body surface by condensation. The water vapor includes but not limited to water vapor formed by evaporation, water vapor in moist air, hot vapor on the human body surface, water vapor in solid or semi-solid excretions. In addition, humidity detection indicates the diffusion range of the liquid.

Electrochemical Medium

Electrochemical medium is a substance that is non-electrical conductive when dry and electrical conductive when wet. It is an arbitrary chemical substance. For example, inorganic salts are inherently non-conductive when dry. When inorganic salts are dissolved, for example, dissolved in water, free ions are present in the solvent to become conductive. This substance can also be a type of substance that undergoes a chemical reaction. For example, these substances are not conductive when dry, but when dissolved, chemical changes occur to generate ions, causing electric conduction. These substances may be, but not limited to inorganic salts ($NaCl$, $MgCl_2$, etc.), or a hydrophilic polymer containing at least one polar or charged functional group, etc. The electrochemical medium 4 has active hygroscopicity. Hydrophilic functional groups are often included in the main chains or side chains of polymers, including but not limited to —$CONH_2$, —OH, —COOH, —$SO_3H$ and —$NH_2$. For example, acrylic acid types include, but are not limited to, acrylic acid, acrylamide, polyethylene, and copolymers modified or copolymerized from the above polymer precursors. Amine functional polymers include, but are not limited to, allylamine, ethyleneimine, enol, and other polymers containing amine groups in their main chains or side chains.

For example, reagents that are used to test blood sugar in the urine or blood will have chemical reactions with a certain type of analytes in the urine or blood, to generate conductive substances.

Signal System

This humidity sensor generally needs to be used in conjunction with the signal system to indicate the user when the liquid humidifies the humidity sensor. For example, on the one hand, the signal system is designed to give signals when the humidity sensor detects a liquid. However, the humidity sensor can be matched with the existing signal system, and the structure of the humidity sensor needs not to include the structure and detection scheme of the signal system. On the other hand, the invention can be combined with other components, such as diapers, to detect the presence of urine, especially for the care of those patients who cannot control their urines, when diapers with humidity sensor are used, once the urine is generated, signals will give reminder, and nursing staffs can guide the urination and deal with them timely. As the sensor of the present invention can be combined with diapers, without being bound to diapers, it is convenient to use in different places and environments.

Humidity Sensor

The humidity sensor of the present invention can be independently manufactured and match with any object to be tested. It has no metal wire, can actively absorb moisture, and recognizes the liquid amount and/or humidity range after being wet, and can be in direct contact with human body.

As shown in FIGS. 1, 3, 5, 6, 8, 9, and 12, a humidity sensor, comprising a substrate having a coating wire and at least one humidity detecting portion S, each humidity detecting portion S comprises at least two electrodes, and each of electrodes is connected to their respective coating wires, and an electrochemical medium which is electrically insulated when dry and conductive when wet is provided between electrodes. A coating wire is a conductive wire which is disposed on the substrate by printing or coating with a conductive adhesive (such as conductive silver adhesive, conductive carbon adhesive) or biochemical ink.

During use, the substrate is fixed on the surface of the absorbent article, and the humidity sensor is directly in contact with the human body; when the liquid substance appears, the liquid is directly in contact with the electrochemical medium on the humidity sensor and then absorbed by the absorbent article. The electrochemical medium of humidity detecting portion wetted by liquid is changed from an insulator to a conductor, and the two electrodes change from an open circuit to a short circuit to output electrical signals.

In some embodiments, the substrate may be insulating but have a water-absorbent material, or the substrate is insulating, but has no water absorbing properties. When the substrate is insulating but has no water absorption, if the electrochemical medium of the humidity detecting portion is dry, it is not conductive, but when it is generally wetted by liquid, the dry electrochemical medium or part of the electrochemical medium forms an electrochemical solution due to the presence of liquid, to cause electrical conduction.

The liquid here can be any solution with water molecules, such as urine, saliva, etc., which directly contacts the electrochemical medium. The substrate may be insulated but has water-absorbent material. At this time, the electrodes are placed on the substrate, and the two electrodes have a gap without contact, and the substrate is coated with a liquid electrochemical medium, and then dried. The electrochemical medium is not electrically conductive when it is dry, so no current is generated between two electrodes. When the substrate absorbs the liquid, the electrochemical medium is wetted, so that the dry electrochemical medium becomes wet or part of the electrochemical medium becomes wet, to form ions in the wet portion, thereby causing an electric current between electrodes.

Humidity Detecting Portion S

In some embodiments, as shown in FIGS. 1, 3, 5, 6, 8, 9, 12, 13, and 14, the humidity detecting portion includes one or more of humidity sensing units S or T. Each humidity detecting portion S emits an ON signal when turned on, and the plurality of humidity detecting portions S emit accumulated ON signals when turned on. For example, the ON signal is a beep, and when only one humidity detecting portion S is turned on, one beep sound is made within unit time; when two humidity detecting portions S are turned on, two beep sounds are made within unit time; and when N humidity detecting portions S are turned on, N beep sounds are made within unit time. Or, when one humidity detecting portion is turned on, beep sound of unit strength is made, and when N humidity detecting portions are turned on, beep sound of N* unit strength is made. The ON signal may also be an optical signal that is transmitted to the reminder signal light at the terminal. The amount of conduction of humidity detecting portion characterizes the amount of liquid and the range of humidity diffusion. The alarm signal is identified and sent by an electric connection structure, or the alarm signal is transmitted to the terminal by the electric connection structure, which is identified and sent by the terminal.

Each coating wire connects at least one electrodes of a humidity detecting portion S. When a plurality of humidity detecting portions S are connected to the same coating wire, the electrochemical medium of the humidity detecting portion S that is not wetted by the liquid is an insulator, and current exists only on the existing coating wire. The wire connected to another electrode of the humidity detecting portion S that is not wetted by the liquid will not form a loop with the existing coating wire. Therefore, setting a plurality of humidity detecting portions S on a coating wire will not cause signal interference and will save the area of the substrate.

Figure 4:
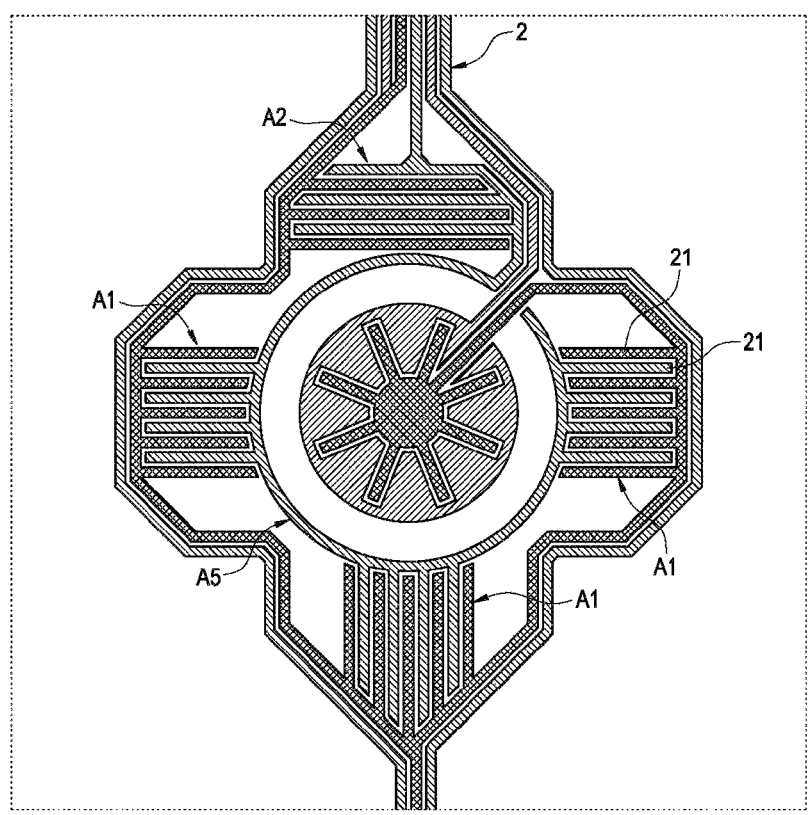
FIG. 4 is a partial enlarged view of the present invention according to FIG. 3.
Figure 6:
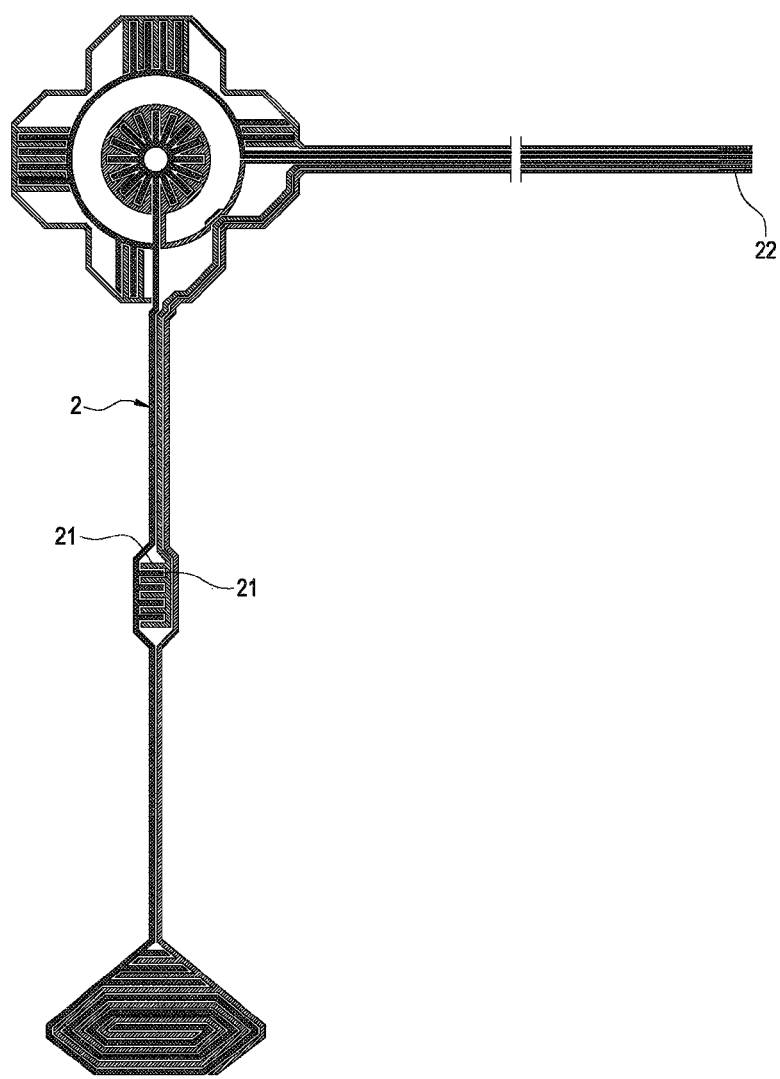
FIG. 6 is a planar top view of a conductive silver adhesive layer of a humidity sensor according to Example 2 of the present invention.
Figure 8:
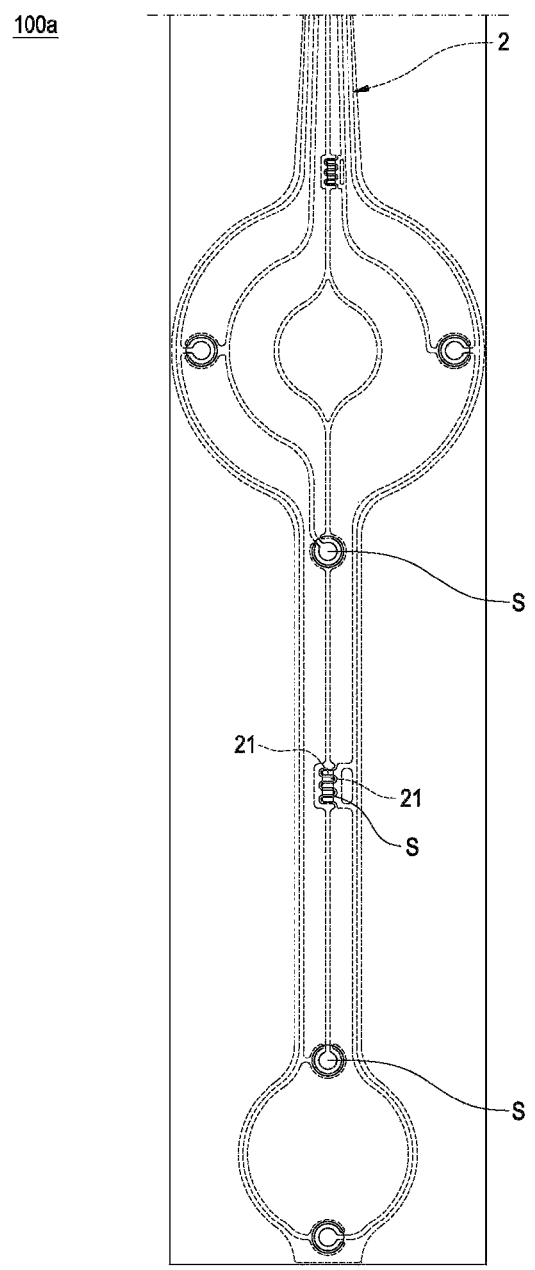
FIG. 8 is a partially enlarged schematic view of a humidity sensor according to Example 4 of the present invention.

In some embodiments, each electrode includes a plate connected to a wire, the electrochemical medium is disposed between two plates, and the plate is a conductive adhesive coating (for example, a screen printed carbon adhesive layer or a silver adhesive layer, etc.). As shown in FIG. 4, FIG. 6 and FIG. 8, one of the plates in the humidity detecting portion is inside the other plate, the outer plate has a notch, and the inner plate and the connecting portion of its coating wire are located in the notch. The inner plate and the outer plate are both circular, and the connecting portion of the inner plate and the connecting portion of the outer plate are straight. The relative area between two plates is increased in an inclusion way, to enhance the sensitivity of the humidity detecting portion S.

Alternatively, as shown in FIGS. 4, 6, 9, 12, 13 and 14, the two plates of the humidity detecting portion S are opposite. There are comb teeth distributed along the plate, and there is a slot between two adjacent comb teeth; and the comb teeth of two electrons are opposite to each other. In the humidity detecting portion S, the comb teeth of one electrode are inserted to the slot of another electrode, and there is a slot between two adjacent comb teeth. A gap exists between two electrodes, and the gap between electrodes is filled by electrochemical medium. The comb teeth increase the sensing area of the electrode, as long as the electrochemical medium between a pair of combs among the two electrodes is wetted, electrical signals will be output, to enhance the sensitivity to humidity sensing. A portion of the coating wire is used as a plate, or the plate is partially overlapped with the coating wire, or the plate is located at the end of the coating wire, or the plate is connected to the end of the coating wire.

In some embodiments, the two electrodes are located on the same layer. The electrochemical medium partially or completely covers the electrodes. During manufacturing, the electrochemical medium solution is dripped to the humidity detecting portion S, and then dried to make the electrochemical medium in an insulated state.

Figure 2:
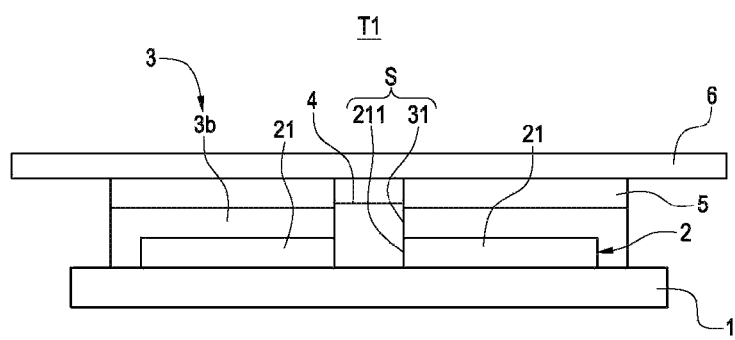
FIG. 2 is a cross-sectional view of a humidity detecting portion S of a humidity sensor according to Example 1 of the present invention.
Figure 7:
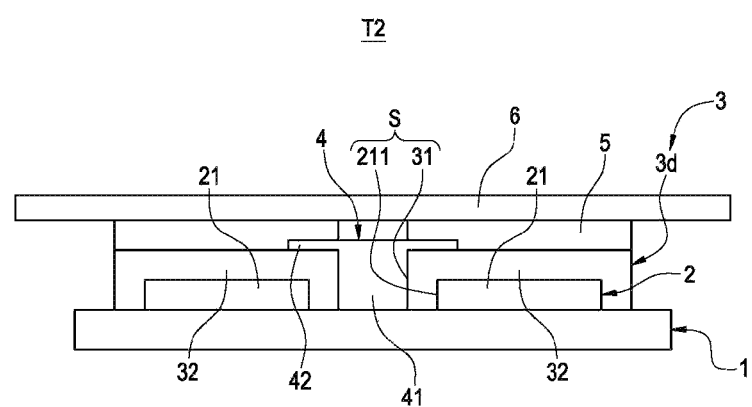
FIG. 7 is a cross-sectional view of a humidity detecting portion S of a humidity sensor according to Example 3 of the present invention.

Alternatively, as shown in FIG. 2 and FIG. 7, each humidity detecting portion comprises a pair of conductive segments, a moisture absorbing hole is disposed between the two conductive segments, and an electrochemical medium is filled in the moisture absorbing hole. The liquid enters the moisture absorbing hole, the electrochemical medium is changed from an insulator to a conductor, and the two conductive segments are turned on to output electrical signals.

Each conductive segment comprises a carbon adhesive layer and a silver adhesive layer, the conductive segment is applied to the substrate surface, and the silver adhesive layer is between the carbon adhesive layer and the substrate. One end of the conductive segment adjacent to the moisture absorbing hole is a first end, and the other end is a second end. The second end of the silver adhesive layer is wrapped in the carbon adhesive layer, both the second end of the silver adhesive layer and the second end of the carbon adhesive layer are exposed to the moisture absorbing hole. There is an electrochemical medium in the gap between the silver adhesive layer and the carbon adhesive layer, as shown in FIG. 2. Alternatively, the silver adhesive layer is wrapped within the carbon adhesive layer, as shown in FIG. 7.

The moisture absorbing hole is filled with an electrochemical medium having an overflow portion. The overflow portion of the electrochemical medium partially covers the two conductive segments. Both the carbon adhesive layer and the silver adhesive layer are involved in electric conduction, the carbon adhesive layer protects the silver adhesive layer, and the silver adhesive layer enhances the electrical signals. The electrochemical medium is filled in the moisture absorbing hole and penetrates into each gap exposed to the moisture absorbing hole, to increase the contact area between the electrochemical medium and the conductive segment, and enhance the sensitivity of the humidity detecting portion S.

Substrate

The substrate is a carrier for the coating wire, and the substrate is water absorbing and hygroscopic. The liquid or water vapor first penetrates into the substance, the electrochemical medium is wetted and electrochemically reacts, and then the corresponding coating wire and the wetted humidity detecting portion output electrical signals. The substrate is an insulator when it is dry; after the substrate absorbs liquid or water vapor, when the humidity is insufficient to cause an electrochemical reaction of the electrochemical medium, the electrical signals cannot be output as alarm signals even if the coating wire outputs electrical signals. If the liquid or moisture absorbed by the substrate only wets the coating wire and the electrochemical medium is still dry or the electrochemical medium is not wetted sufficiently to have electrochemical reactions, the electrical signal output between the coating wires cannot cause interference on electrochemical signals generated by the electrochemical reactions of humidity detecting portion.

The substrate herein comprises at least two parts, one part is treated with an electrochemical medium and the other part is not treated with an electrochemical medium. The treatment may be carried out by dripping an electrolytic medium solution onto the substrate. Generally, any water-absorptive substrate can be used as the substrate of the present invention, for example, water-absorbent filter paper, glass fiber, cotton, and the hygroscopicity or water absorption is the absorption or retention of water under capillary action. By this way, a treated electrochemical medium and a non-treated electrochemical medium are formed on the substrate. When the substrate is water-absorptive, it is possible that the wet place is not treated with electrochemical medium, but the conductive coating passes; at this time, the place treated with electrochemical medium is not wetted, and although the place where the conductive coating passes is wet, it will not form a current conduction. Conversely, only after the place where the electrochemical medium is treated is wetted, a current can be generated between the electrodes connected to the conductive coating.

The "current conduction" herein does not absolutely form any electron movement, but it is a relative concept. Regardless of the material of the base material, the electrochemical medium is treated at different positions in the base layer, and the electrochemical medium is connected to or in contact with the electrode, the electrode is connected to the coating wire. When the electrochemical medium is disposed at different positions on the base layer, the electrochemical medium of each place is connected to or in contact with the electrode, and the connection between the electrode and the coating wire in each place provides a current loop structure. At this time, when the base layer is dry, there is no current conduction between the two electrodes of the electrochemical contact, or between the wire coatings of the wires (generally two). However, when the base layer is wet, at this time, the wet place is generally uncontrolled, including the following cases: the place with electrochemical medium is wetted while the place where the conductive coating is provided as the wire is not wetted; or, both the place with electrochemical medium and the place where the conductive coating is provided are wetted; or place where the conductive coating as the electric wire is set is first wetted (the first position), then the liquid from the first position enters or flows into or is introduced to the place where an electrochemical medium is set, to cause the place with electrochemical medium to be wetted in sequence. In either case, only when necessary or when the place with electrochemical medium is wetted, a signal is generated to indicate that an electrochemical position that is set in advance is wetted due to the current conduction. Regardless of where the electrochemical treatment or the liquid is from (for example, some from the body, or from other places on the substrate, such as those that do not have an electrochemical medium), only when the electrochemical place is wetted, the signals can be generated to indicate that an electrochemical position that is set in advance is wetted due to current conduction. Other places (excluding those treated with electrochemical medium) will not cause current conduction even if wetted, so that no signal is given to indicate that there is moisture or liquid production.

In fact, in order to better detect the wetted parts and accurately emit wet signals, it is not always desirable to issue wet signals by formation of current conduction after coating wires are wetted, and if so, the test results are not accurate. Therefore, it can be considered that the liquid only wets the area between any two coating wires, but the liquid does not diffuse to the humidity detecting portion (the electrochemical detecting portion is treated with the electrochemical medium), and the electrical signal appearing between the coating wires cannot be recognized as a humidity alarm signal by the electric connection structure. For example, if the electrical signal is weak or does not exist, it cannot be recognized by the electric connection structure. Alternatively, for the selection of the base material, even if the liquid only wets the area between any two coating wires, there is no electron transfer between the coating wires and no current conduction, for example, the base layer is an insulator.

Alternatively, the electrical signal as the humidity alarm signal has an intensity range ( ), and the electric connection structure can only recognize the electrical signal within the intensity range as a humidity alarm signal. If the electrical signal between the coating wires is lower than the lower limit of the intensity of the humidity alarm signal, or higher than the upper limit of the intensity of the humidity alarm signal, the electric connection structure will not recognize the electrical signals outside the intensity range. For example, because there are places on the substrate where the electrochemical medium is treated and not treated, theoretically, the two different regions exhibit different conductivity when they encounter the same degree of wetting. The magnitude of the current of the conductivity is different, and the electrical signal can be set by the magnitude of the gene current. For example, after the place where the electrochemical medium is previously set is wet, the current is within a range, after the place where the electrochemical medium is not previously set is wetted, the current is also within a range, but these two current ranges are not the same and are not overlapped. Generally, the conductivity of a place where an electrochemical medium is treated is greater than that of the place where an electrochemical medium is not treated, because the conductive coating may pass through a place having no electrochemical medium, or may pass through a place having an electrochemical medium (forming a humidity detecting portion), at this time, if a voltage is applied between the wires and a current formed in the place where the electrochemical medium is treated is larger than a place where the electrochemical medium is not treated, the current range of an electrochemical medium and the current range of the place where the electrochemical medium is not treated, thereby selectively identifying current to show the wetting place and extent. For example, the current range with an electrochemical medium is 0.1-5 A, and the current range without an electrochemical medium is less than 0.1 A. At this time, although the part without an electrochemical medium is wetted and current is generated, no alarm will be given. On the contrary, if the current between the two wires is greater than 0.1 A, it is considered that the place where the electrochemical medium is treated is wetted, and an alarm is caused, indicating it is wetted.

In some embodiments, the substrate is a hygroscopic paper tape. For example, the filter paper, rice paper, plant fiber absorbent papers, etc. Because they have excellent hygroscopicity and the liquid will not spread easily, they can be used as a substrate.

Figure 12:
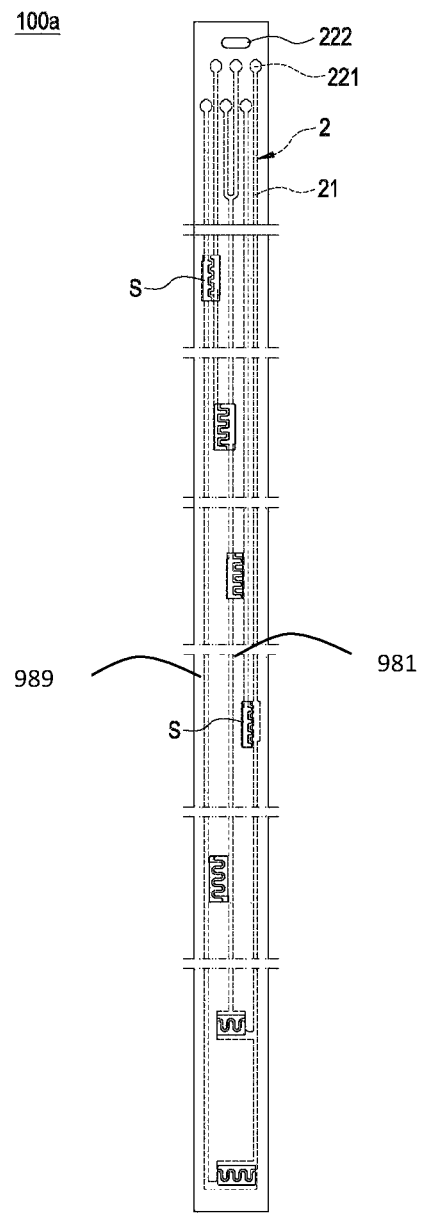
FIG. 12 is an enlarged schematic view of a humidity sensor according to Example 6 of the present invention.
Figure 13:
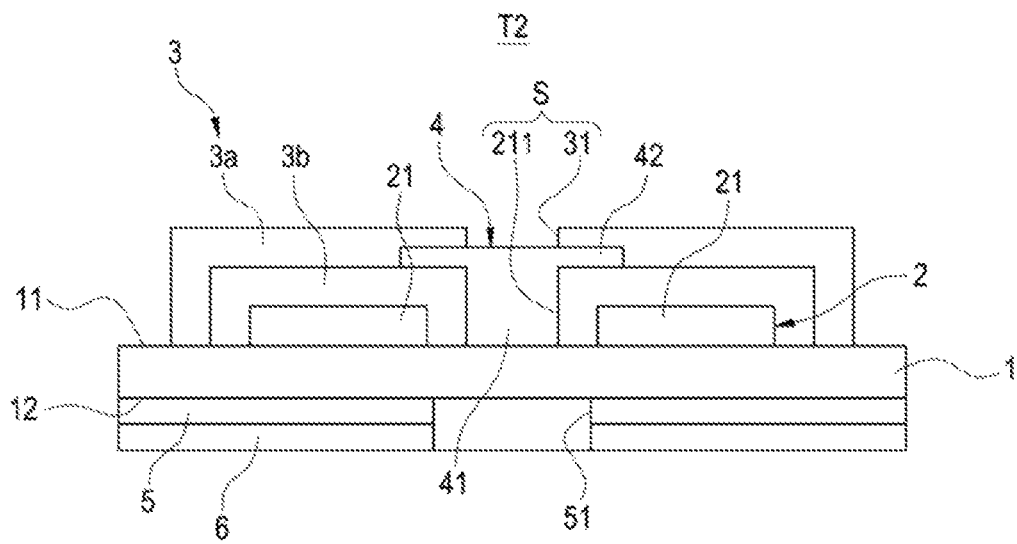
FIG. 13 is a cross-sectional view of a humidity detecting portion S of a humidity sensor according to another embodiment of the present invention.
Figure 14:
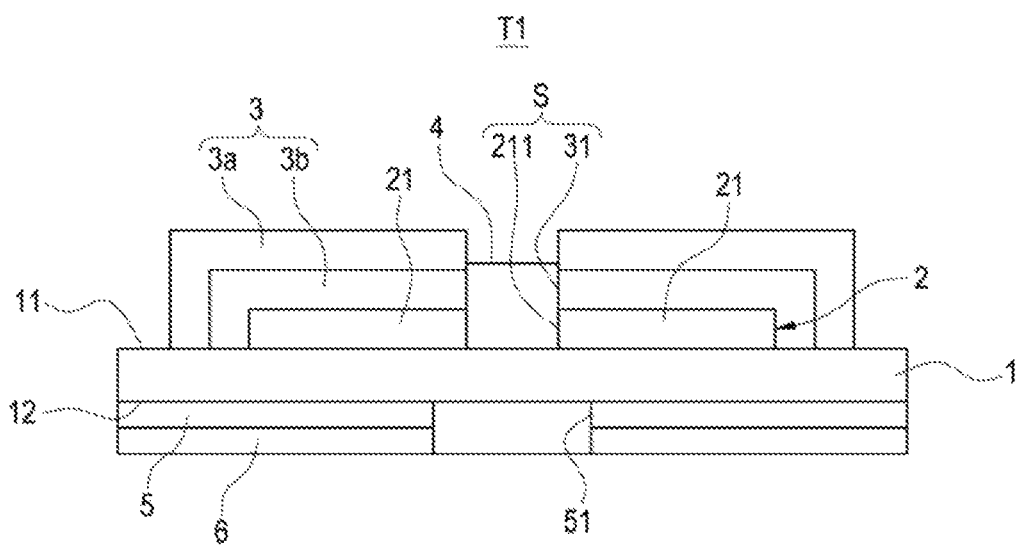
FIG. 14 is cross-sectional view of a humidity detecting portion S of a humidity sensor according to still another embodiment of the present invention.

In some embodiments, as shown in FIG. 12, the substrate is a strip-shaped absorbent paper of equal width, and the humidity detecting portion S is spaced apart along the length direction of the substrate. The electrode plates in the S portion can be arbitrarily arranged, and each electrode plate has a certain distance without contact, but the electrochemical medium is treated on the electrode plate, and then dried. In those parts where the electrochemical medium is not processed, such as the marks 989 and 981 in FIG. 12, there are conductive coating, but even if the marks 989 and 981 are wetted, the conductive coating will not form a loop, and there will be no generation of current and generation of signals. Only when the S portion is wetted, a loop will form, to generate signals. This is only a relative state. As mentioned above, the conductivity treated with electrochemical medium is different from that without electrochemical medium, to generate different current or voltage, so that the device can be distinguished. For example, only the parts treated with electrochemical medium form a loop to give signal prompts, on the contrary, the parts not treated with electrochemical medium will not give signal prompts even if they are turned on.

As an embodiment, as shown in FIGS. 1, 3, 5, 6, 8, and 9, the substrate has at least one enlarged portion; the enlarged portion has a humidity detecting portion S disposed at intervals along the width direction.

Alternatively, materials that are not very hygroscopic, or even have no hygroscopicity, can be selected for the substrate, such as plastic sheets, but in the place where the electrochemical medium is treated, it is hygroscopic. As there are two electrodes arranged in the place where the electrochemical medium is treated, as long as the electrochemical medium encounters water molecules, some or all of them will form an electrochemical solution, resulting in electrical conduction.

As an embodiment, the substrate comprises a detection section and a signal connection section, the humidity detection portion S is disposed at the detection section, the signal input terminal is disposed at the signal connection section, and the detection section and the signal connection section have formed an angle. The detection section is orthogonal to the signal connection section. The substrate has at least one enlarged portions and the enlarged portions have one or a plurality of humidity detecting portions S.

A positioning hole is disposed on the substrate and the positioning hole is offset from the coating wire and the humidity detecting portion. During use, the humidity sensor needs to be connected to a connector that can input current to the humidity sensor. The positioning hole is used to match the connector to determine the correct position between the humidity sensor and the connector.

The front side of the substrate is provided with a coating wire, the back of the substrate is printed with a pattern, and the pattern is printed with a material that exhibits color in case of water. After the substrate absorbs the liquid, the patterns appear, having the aesthetic and indicating functions.

Coating Wire

In some embodiments, as shown in FIGS. 1, 3, 5, 6, 8, 9, 12, there are multiple coating wires, without crossing between them. All coating wires are on the same layer, and there is no intersection between the coating wires, therefore, there is no signal interference.

There is a humidity detecting portion S between two adjacent coating wires. There is a humidity detecting portion S between the two outermost coating wires.

In some embodiments, as shown in FIG. 12, the coating wires extend along the direction of the length of substrate. The outermost two wires are respectively line segments parallel to the substrate. Each wire has a parallel segment parallel to the substrate. One end of the parallel segment is a signal terminal which is used to connect current. All coating wires from the first one to the last one are numbered by natural numbers, and there are humidity detecting portions S between adjacent odd-numbered wires, or there are humidity detecting portions S between adjacent even-numbered wires. By this way, the highest area utilization rate of the substrate is achieved, to effectively utilize each wire, and the maximum number of humidity detecting portions S is available to expand the range of humidity detection.

As an embodiment, as shown in FIGS. 1, 3, 5, 6, 8, and 9, the pattern formed by the coating wire has at least one enlarged region having one or more humidity detecting portions S. The humidity detecting portions S are disposed separately along the length direction or along the width direction of the substrate, or along the length direction and the width direction of the substrate. The enlarged region is provided with an enlarged portion on the substrate; or the substrate is a strip of equal width, and only the pattern formed by the coating wire has an enlarged region. The center of the enlarged region is provided with a humidity detecting portion S. The setting of the enlarged region is to expand the humidity detection range in the liquid concentrated area.

Adhesive Layer

In some embodiments, as shown in FIG. 2 and FIG. 7, a humidity sensor has an adhesive layer. The adhesive layer enables objects to attach to or adhere to any place where humidity sensing is required, for example, the adhesive layer is a self-adhesive layer. The coating wire is located between the adhesive layer and the substrate. The adhesive layer not only acts as an adhesive but also seals the coating wire and the electrochemical medium between the adhesive layer and the substrate. When in use, the liquid must pass through the substance to reach the humidity detecting portion S to prevent the electrode misleading and misjudgment of the amount of liquid caused by direct liquid access to the humidity detecting portion S without absorption by the substrate due to liquid fluidity. The electrochemical medium is above the electrode and the adhesive layer covers the electrochemical medium and electrode.

Release Sheet Layer

In some embodiments, as shown in FIG. 2 and FIG. 7, the adhesive layer is detachably attached with a release sheet layer. The release sheet layer is a resin film, which fully covers the substrate. A free separation segment is provided between the release sheet layer and the substrate. The adhesive layer covers the area of the substrate other than the free separation segment. The free separation segment may facilitate the separation of the release sheet layer from the substrate.

Humidity Sensor Coil

The humidity sensor coil comprises a plurality of humidity sensors, and the humidity sensors are sequentially arranged along the length direction. The head end of the first humidity sensor is a free end, and the tail end of the last humidity sensor is a free end, and the humidity sensors are wound into a coil in sequence from the first humidity sensor.

In some embodiments, a separation mark is provided between two adjacent humidity sensors, and the separation mark is a crease, or a tear line, etc.

The coil includes a mandrel, and the head end of the first humidity sensor is fixed to the mandrel. The humidity sensor is accommodated around the mandrel. The tail end of the last humidity sensor has a fixture, to prevent the coil from loosening.

In some embodiments, the humidity sensor in the coil comprises a substrate, a coating wire, a humidity detecting portion S and an electrochemical medium. During use, a humidity sensor is removed and then attached to the article to be tested by bonding or other ways.

In some embodiments, the humidity sensor in the coil comprises a substrate, a coating wire, a humidity detecting portion S, an electrochemical medium, an adhesive layer, and a release sheet layer. During use, the humidity sensor is removed, and attached to the article to be tested by the adhesive layer after tearing off the release sheet layer.

A plurality of humidity sensor is stored in coils, to facilitate transportation, storage and receiving.

Humidity Sensor Strip

The humidity sensor coil comprises a plurality of humidity sensors, and the humidity sensors are sequentially arranged along the length direction. The head end of the first humidity sensor is a free end, and the tail end of the last humidity sensor is a free end, the adjacent front and rear humidity sensors are folded, and the fold location is the boundary of two humidity sensors. A plurality of humidity sensors are folded into the length of humidity sensors for easy storage.

In some embodiments, the boundary is a discontinuous tear line, to facilitate availableness of a single humidity sensor.

Example 1

The humidity detecting portion of the present invention, as shown in FIG. 1, FIG. 2, FIG. 3, FIG. 4, and FIG. 5, is a first embodiment of the humidity sensor of the present invention. The humidity sensor is shown in FIG. 1, FIG. 2, FIG. 3, FIG. 4 and FIG. 5. The first embodiment of the humidity sensor 100 comprises a substrate 1 and a plurality of humidity detecting portions ST1. The substrate 1 has a front surface 11 and a back surface 12 opposite to each other, and each humidity detecting portion ST1 is disposed side by side on the front surface 11 of the substrate 1.

Each humidity detecting portion ST1 comprises a conductive silver adhesive layer 2, a carbon adhesive layer 3b, and an electrochemical medium electrochemical medium 4.

The conductive silver adhesive layer 2 comprises two conductive segments 21 spaced apart from each other, and a contact absorbing hole 211 is formed between the two conductive segments 21 so that the two conductive segments 21 of the conductive silver adhesive layer 2 can be temporarily separated from each other by the moisture absorbing hole 211.

The carbon adhesive layer 3b is covered on the conductive silver adhesive layer 2 and the moisture absorbing hole 211 combine together to form a moisture absorbing hole S. The present invention does not limit the structure of the moisture absorbing hole 211 and the combination thereof. In the present embodiment, taking the moisture absorbing hole S formed by connecting with the moisture absorbing hole 211 in a straight line as an example, this embodiment is described. Of which, the conductive carbon adhesive layer 3b can also be used to protect the conductive silver adhesive layer 2 from oxidation.

The electrochemical medium 4 is filled in the moisture absorbing hole S, and the electrochemical medium 4 is connected between the two conductive segments 21 and correspondingly connected to the carbon adhesive layer 3b. At this time, since it is not wetted, it is not turned on, as described in the following paragraph.

The electrochemical medium 4 is a material which can undergo chemical changes in the presence of moisture and produces an excellent conductive material. In the present embodiment, a hydrophilic polymer containing at least one polar or charged functional group is taken as an example to make the electrochemical medium 4 to have active moisture absorption. Hydrophilic functional groups are often included in the polymer main chain or side chain, including but not limited to CONH2-, —OH, —CONH, —COOH, —SO3H, —NH2. For example, acrylics include but are not limited to, acrylic acid, acrylamide, polyethylene, and copolymers modified or copolymerized from the above polymer precursors. Amine functional polymers include but not limited to allylamine, ethyleneimine, enol, and other polymers containing an amine group in their main chains or side chains.

Figure 5:
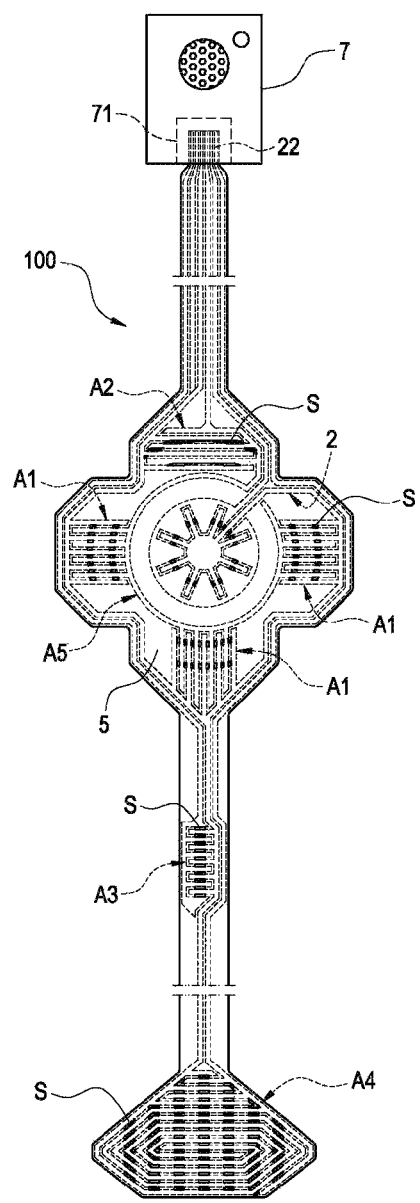
FIG. 5 is a planar perspective view of a humidity sensor connected to a receiver according to Example 1 of the present invention.

When the humidity detecting portion ST1 of the present invention encounters a liquid (not shown in the figure), the electrochemical medium 4 will actively absorb moisture through the moisture absorbing hole S, and chemically change after moisture absorption to produce an excellent conductive substance. Further, the conduction between the two conductive segments 21 and the conduction of the carbon adhesive layer 3b cause the conductive ceramic adhesive layer 2 to form a conduction loop. At this time, if a receiver 7 is electrically connected between the two conductive segments 21 of the conduction circuit (as shown in FIG. 5), the receiver 7 will be turned on to emit sound, light or prompt or warning signals of sound and light, even wirelessly transmit to smart mobile phones for notification and warning.

In order to facilitate the attachment of the humidity sensor to the object to be tested, an adhesive layer adhesive layer 5 and a release sheet layer 6 may be disposed on the substrate and the coating wire. Further, the present invention does not limit the shape of the humidity sensor 100. In the present embodiment, a straight strip shape (see FIG. 1 or FIG. 3) will be described as an example.

The substrate 1 can be any object having water absorption characteristics and used to carry other structural layers. In the present embodiment, the straw fiber absorbent paper is taken as an example for illustration.

Figure 3:
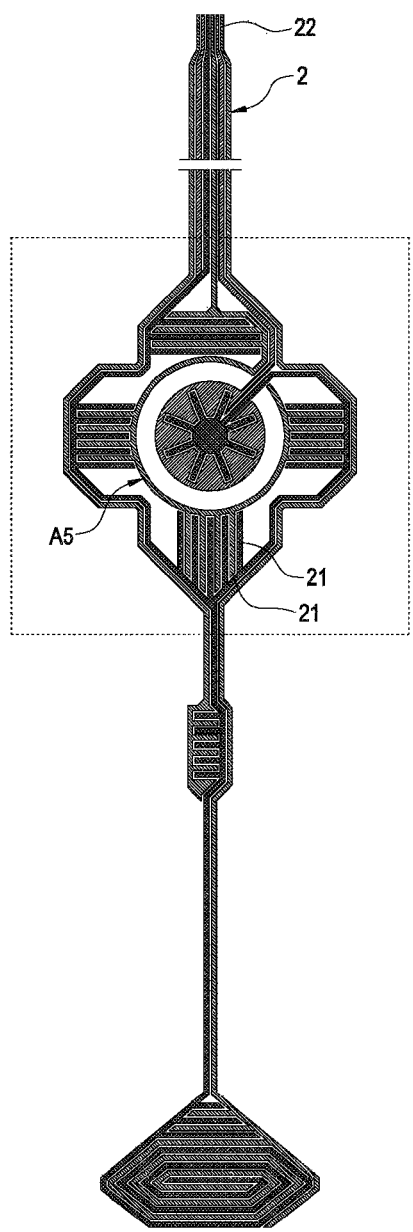
FIG. 3 is a planar top view of a conductive silver adhesive layer in FIG. 1 of the present invention.

The conductive silver adhesive layer 2 of each humidity detecting portion ST1 is stacked side by side on the front surface 11 of the substrate 1, and their respective moisture absorbing holes 211 are connected to the substrate 1. It should be noted (as shown in FIG. 1 and FIG. 3) that the two conductive segments 21 can be presented in main line (or trunk line) type of the conductive silver adhesive layer 2, branch line type can also be used to present the two conductive segments 21. It is not limited in the present invention. In the present embodiment, taking the mixed use of the main line and the branch line as an example, the conductive silver adhesive layer 2 further comprises several pairs of conductive segments 21 as shown in the figure.

The carbon adhesive layer 3b covers the conductive silver adhesive layer 2 of all humidity detecting portions ST1, and corresponds to the moisture absorbing holes 211 of all humidity detecting portion ST1, thereby forming a plurality of moisture absorbing holes S.

The electrochemical medium 4 is filled in the moisture absorbing hole S of each humidity detecting portion ST1 and is respectively connected between each pair of conductive segments 21.

The adhesive layer 5 is disposed on the carbon adhesive layer 3b, so that the humidity sensor 100 can be attached and adhered to any humidity that needs to be sensed. For example, it can be attached or adhered to a raincoat, a diaper, or a place to identify if there is water or rain leakage, etc. As stated above, the adhesive layer 5 is provided in conjunction with the carbon adhesive layer 3b. In addition, the adhesive layer 5 can be any adhesive material. In the present embodiment, the water gel is taken as an example for description.

The release sheet layer 6 is detachably attached and adhered to the adhesive layer 5, and the release sheet layer 6 is peeled off when the humidity sensor 100 of the present invention needs to be pasted. It should be noted that the height of the electrochemical medium 4 after filling is preferably higher than (or equal to) the carbon adhesive layer 3b and lower than the adhesive layer 5 (as shown in FIG. 2), to form a break on the outer surface of the adhesive layer 5.

In addition, the aforesaid conductive silver adhesive layer 2 may be in various shapes. In this embodiment, taking the designed pattern layer (the component symbol is not marked) as an example, any one of the pattern layers is spaced apart from each other and forms a large sensing area, the end part is gathered to form a connecting portion 22 (as shown in FIG. 1) to facilitate electrical connection of the aforementioned receiver 7 as shown in FIGS. For example, as shown in FIG. 1 and FIG. 3, a plurality of first sensing areas with large area A1 and a second sensing area with large area A2 may be gathered around the main sensing part (for a diaper, it is the part corresponding to a human urination organ), and surrounded by a circular fifth sensing area with large area A5. The shapes of the first and second sensing areas with large areas A1, A2 are elongated strip-shaped teeth. As for the fifth sensing area with large area A5, it is a combination of a circle and a multi-astronomical star; in addition, a fourth sensing area with large area A4 may be formed by two swirling vortexes in another main sensing part (or a diaper, it is the part corresponding to a human urination organ). In addition, a third sensing area with large area A3 may be formed between the aforesaid two sensing parts.

Therefore, the present invention can provide a warning according to the conduction of each area by a plurality of large area sensing areas (the first to the fifth sensing areas with large area A1~A5), thereby allowing users or notified persons to clearly know the range or extent of wetness.

Example 2

FIG. 6 shows the humidity detecting portion ST1 and the embodiment 2 of the humidity sensor 100 having the module T1 of the present invention. The embedment 2 is substantially the same as the embodiment 1 described above. The difference only lies in the change in the overall shape from the strip shape in the embodiment 1 to the L-shaped transition shape of the embedment 2. The rest of the structure, such as the humidity detecting portion S, is the same as those in the embodiment 1.

Example 3

A third embodiment of the humidity detecting portion ST2 of the present invention and the humidity sensor 100 having the module T2 is shown in FIG. 7. The third embodiment is substantially the same as the first or the second embodiment except that the structures of the protection layer 3 and the electrochemical medium 4 are different. The following is a detailed description of a humidity detecting portion ST2.

The carbon adhesive layer 3b has the two carbon adhesive portions 32 respectively covering the two conductive segments 21 and is formed between the two carbon adhesive portions 32 so that the two conductive segments 21 are spaced apart from each other across the two carbon adhesive portions 32. The adhesive layer 5 and the carbon adhesive layer 3b are arranged together. At this time, the moisture absorbing hole 211 is surrounded, so the electrochemical medium 4 can only be packed.

It should be noted that the carbon adhesive layer 3b is also electrically conductive, and since the carbon adhesive portion 32 is overlaid on the conductive segment 21, the conductive sequence of the third embodiment is the carbon adhesive layer 3b first and then the conductive silver adhesive layer 2. Therefore, when the electrochemical medium 4 absorbs moisture, the two conductive segments 21 will be able to be turned on via the two carbon adhesive portions 32. In other words, the carbon adhesive layer 3b has both protective and conductive effects, and the main function of the conductive silver adhesive layer 2 is to enhance the signals in the third embodiment.

The electrochemical medium 4 comprises a packing portion 41 and a span portion 42, and the packing portion 41 is packed in the moisture absorbing hole S and adjacent to one side of the two carbon adhesive portions 32 (for example, the right side and left side of the carbon adhesive portion 32 in FIG. 7). The span portion 42 extends between the adhesive layer 5 and the carbon adhesive layer 3b while spanning two carbon adhesive portions 32 and adjacent to the other side of two carbon adhesive portions 32 (for example, the top side of the carbon adhesive portion 32 in FIG. 7). The rest of the structure is the same as those in the first embodiment.

Example 4

As shown in FIG. 8, a humidity sensor, comprising an insulator substrate having a coating wire and at least one humidity detecting portion S, each humidity detecting portion S comprises at least two electrodes, and each of electrodes is connected to their respective coating wires, and an electrochemical medium which is electrically insulated when dry and conductive when wet is provided between electrodes. A coating wire is a conductive wire which is disposed on the substrate by printing or coating with a conductive adhesive (such as conductive silver adhesive, conductive carbon adhesive) or biochemical ink.

The pattern formed by the coating wire has at least one enlarged region having one or more humidity detecting portions S. The humidity detecting portions S are disposed separately along the length direction or along the width direction of the substrate, or along the length direction and the width direction of the substrate. As shown in FIG. 8, there are two circular enlarged portions, the first enlarged portion is in the front and the second enlarged portion is in the back. The diameter of the first enlarged portion is larger than the second enlarged portion. The first enlarged portion is provided with humidity detecting portions S distributed separately along the width direction, and the second enlarged portion is provided with humidity detecting portions S distributed separately along the length direction.

The enlarged region is provided with an enlarged portion on the substrate; or the substrate is a strip of equal width, and only the pattern formed by the coating wire has an enlarged region. The center of the enlarged region is provided with a humidity detecting portion S. The setting of the enlarged region is to expand the humidity detection range in the liquid concentrated area. Compared with embodiment 1, the coating wire is designed as a pattern layer (component symbols are not marked) that is simplified in shape and quantity in embodiment 4, to reduce the cost, but it still has the basic humidity sensing.

The humidity detecting portion S is distributed along the length direction of the substrate in the area other than the enlarged portion.

Each wire has a parallel segment parallel to the substrate. One end of the parallel segment is a signal terminal which is used to connect current. All coating wires from the first one to the last one are numbered by natural numbers, and there are humidity detecting portions S between adjacent odd-numbered wires, or there are humidity detecting portions S between adjacent even-numbered wires. In this way, the area utilization rate of the substrate is the highest, and each wire is effectively utilized to obtain the maximum number of humidity detecting portions S, thereby enhancing the humidity detection range.

The rest of the structure is the same as those in one of embodiments 1-3 except for the shape and number of the coating wires.

Example 5

Figure 9:
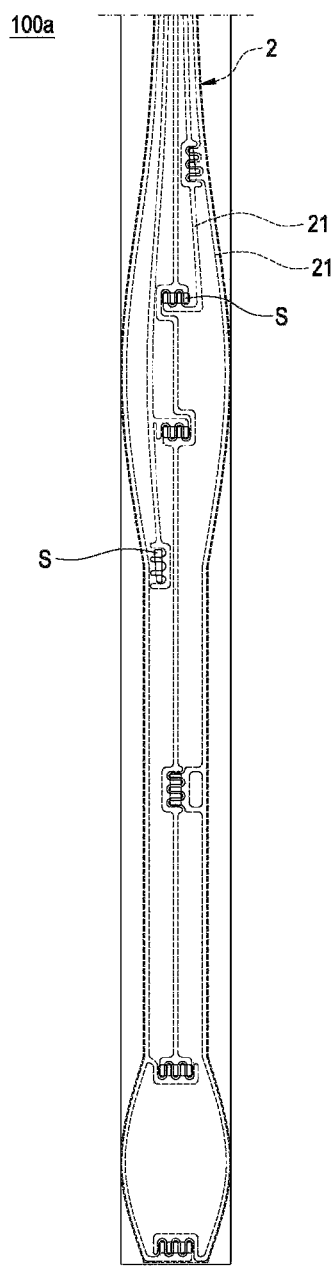
FIG. 9 is a partially enlarged schematic view of a humidity sensor according to Example 5 of the present invention.

As shown in FIG. 9, the humidity sensor of the present embodiment is different from that in the Embodiment 4 in that both of the enlarged portions formed by the coating wire are elliptical, and the long axis of the enlarged portion is along the length direction of the substrate. The first enlarged portion is provided with a plurality of humidity detecting portions S spaced apart in the length direction. The second enlarged portion is provided with a plurality of humidity detecting portions S that are not spaced apart in the length direction.

The enlarged portion is set to an elliptical shape to reduce the width of the coating wire pattern, which can save paper materials compared with the embodiment 4. The rest of the structure is the same as that in embodiment 4 except for the shape of the enlarged portion.

Each wire has a parallel segment parallel to the substrate. One end of the parallel segment is a signal terminal which is used to connect current. All coating wires from the first one to the last one are numbered by natural numbers, and there are humidity detecting portions S between adjacent odd-numbered wires, or there are humidity detecting portions S between adjacent even-numbered wires. In this way, the area utilization rate of the substrate is the highest, and each wire is effectively utilized to obtain the maximum number of humidity detecting portions S, thereby enhancing the humidity detection range.

The difference in this embodiment is that the coating wire is designed as a pattern layer (component symbols are not marked) that is simplified in shape and quantity, to reduce the cost, but it still has the basic humidity sensing.

Example 6

As shown in FIG. 12, a humidity sensor, comprising an insulator substrate having a coating wire and a plurality of humidity detecting portions S, each humidity detecting portion S comprises at least two electrodes, and each of electrodes is connected to their respective coating wires, and an electrochemical medium which is electrically insulated when dry and conductive when wet is provided between electrodes.

Each electrode includes a plate connected to a wire, the electrochemical medium is disposed between two plates, and the plate is a conductive adhesive coating (for example, a screen printed carbon adhesive layer or a silver adhesive layer, etc.). The two plates of the humidity detecting portion S are opposite. There are comb teeth distributed along the plate, and there is a slot between two adjacent comb teeth; and the comb teeth of two electrons are opposite to each other. In the humidity detecting portion S, the comb teeth of one electrode are inserted to the slot of another electrode, and there is a slot between two adjacent comb teeth. A gap exists between two electrodes, and the gap between electrodes is filled by electrochemical medium. The comb teeth increase the sensing area of the electrode, as long as the electrochemical medium between a pair of combs among the two electrodes is wetted, electrical signals will be output, to enhance the sensitivity to humidity sensing. A portion of the coating wire is used as a plate, or the plate is partially overlapped with the coating wire, or the plate is located at the end of the coating wire, or the plate is connected to the end of the coating wire.

Two electrodes are located on the same layer. The electrochemical medium partially or completely covers the electrodes. During manufacturing, the electrochemical medium solution is dripped to the humidity detecting portion S, and then dried to make the electrochemical medium in an insulated state.

The substrate is a strip-shaped absorbent paper of equal width, and the humidity detecting portion S is spaced apart along the length direction of the substrate.

The substrate comprises a detection section and a signal connection section, the humidity detection portion S is disposed at the detection section, the signal input terminal is disposed at the signal connection section, and the detection section and the signal connection section have formed an angle. The detection section is orthogonal to the signal connection section. The substrate has at least one enlarged portions and the enlarged portions have one or a plurality of humidity detecting portions S.

A positioning hole is disposed on the substrate and the positioning hole is offset from the coating wire and the humidity detecting portion. During use, the humidity sensor needs to be connected to a connector that can input current to the humidity sensor. The positioning hole is used to match the connector to determine the correct position between the humidity sensor and the connector.

The front side of the substrate is provided with a coating wire, the back of the substrate is printed with a pattern, and the pattern is printed with a material that exhibits color in case of water. After the substrate absorbs the liquid, the patterns appear, having the aesthetic and indicating functions.

The coating wires extend along the direction of the length of substrate. The outermost two wires are respectively line segments parallel to the substrate. Each wire has a parallel segment parallel to the substrate. One end of the parallel segment is a signal terminal which is used to connect current. All coating wires from the first one to the last one are numbered by natural numbers, and there are humidity detecting portions S between adjacent odd-numbered wires, or there are humidity detecting portions S between adjacent even-numbered wires. In this way, the area utilization rate of the substrate is the highest, and each wire is effectively utilized to obtain the maximum number of humidity detecting portions S, thereby enhancing the humidity detection range.

A humidity sensor has an adhesive layer. The adhesive layer enables objects to attach to or adhere to any place where humidity sensing is required, for example, the adhesive layer is a self-adhesive layer. The coating wire is located between the adhesive layer and the substrate. The adhesive layer not only acts as an adhesive but also seals the coating wire and the electrochemical medium between the adhesive layer and the substrate. When in use, the liquid must pass through the substance to reach the humidity detecting portion S to prevent the electrode misleading and misjudgment of the amount of liquid caused by direct liquid access to the humidity detecting portion S without absorption by the substrate due to liquid fluidity. The electrochemical medium is above the electrode and the adhesive layer covers the electrochemical medium and electrode.

The adhesive layer is detachably attached with a release sheet layer. The release sheet layer is a resin film, which fully covers the substrate. A free separation segment is provided between the release sheet layer and the substrate. The adhesive layer covers the area of the substrate other than the free separation segment. The free separation segment may facilitate the separation of the release sheet layer from the substrate.

In addition, since the carbon adhesive layer 3b in the foregoing embodiments has the function of protecting the conductive silver adhesive layer 2, it can serve as a protection layer 3 (shown in FIG. 2 and FIG. 7) for protecting the conductive silver adhesive layer 2. Furthermore, the humidity sensors 100 and 100a of the embodiments 1-6 may also be arranged in multiples and connected in series with each other, and are preferably bundled and wound in a strip type; and the connection between any two adjacent humidity sensors 100 and 100a is a tearable design to facilitate the tearing of a section of the humidity sensors 100 and 100a during use.

As shown in FIG. 5, there are a variety of electrical connections between the foregoing connecting portion 22 of the humidity sensors 100, 100a and the receiver 7 of the present invention, which is not limited herein. Only one of the examples will be described below.

Figure 10:
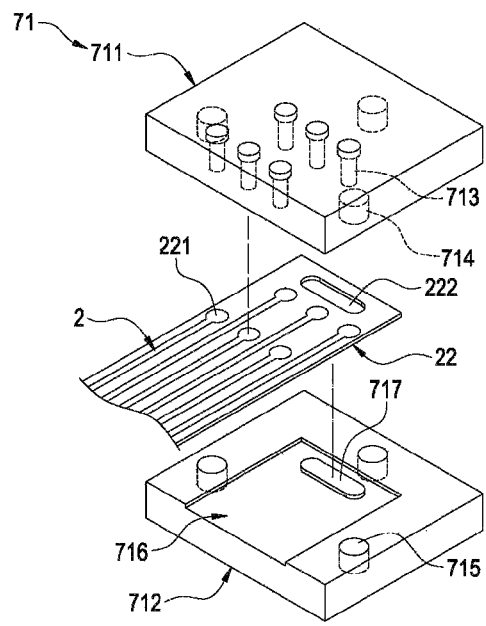
FIG. 10 is an exploded perspective view showing electrical connection between a connecting portion and a receiver in a humidity sensor of the present invention.
Figure 11:
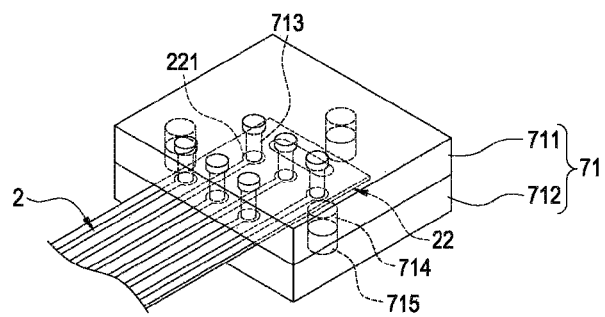
FIG. 11 is a perspective assembled view of FIG. 10 according to the present invention.

As shown in FIG. 10 and FIG. 11, and in combination with FIG. 5, one side of the connecting portion 22 is provided with a plurality of connecting points 221, which are electrically connected to the conductive silver adhesive layer 2. An electric connection structure 71 is disposed inside the receiver 7, and the humidity sensors 100 and 100a are electrically connected to the electric connection structure 71 of the receiver 7 by the connecting portion 22.

The electric connection structure 71 comprises a first structural member 711 and a second structural member 712 that are clamped from each other. The first structural member 711 is configured with a plurality of conductive terminals 713 and a plurality of first magnetic members 714, and the second structural member 712 is configured with a plurality of second magnetic members 715. Each conductive terminal 713 corresponds to each connecting point 221, and each first magnetic member 714 corresponds to each second magnetic member 715. Thereby, the first structural member 711 and the second structural member 712 can be relatively clamped by the magnetic attraction of the first magnetic member 714 and the second magnetic member 715, and the connecting portion 22 is clamped between the first structural member 711 and the second structural member 712, so that each conductive terminal 713 is electrically connected to each other at each connecting point 221.

The positioning manner of clamping between the first structural member 711 and the second structural member 712 can be achieved by magnetic adsorption as shown in the figure, of course, other manners such as snapping or tight fitting can also be used for positioning, which is not limited herein.

Preferably, a caulking groove 716 may be provided on the clamping surface of the first structural member 711 or the second structural member 712, and the connecting portion 22 is embedded in the caulking groove 716 so that the relative clamping of the first structural member 711 and the second structural member 712 will not be subjected to the interference of the connecting portion 22. Furthermore, a stopper body 717 can be protruded and arranged in the caulking groove 716, and the connecting portion 22 is provided with a sleeved hole 222 corresponding to the stopper body 717, so that the connecting portion 22 embedded in the caulking groove 716 can be blocked by the stopper body 717 without being pulled out or moved mistakenly.

There is a plurality of humidity detecting portions S. Each humidity detecting portion S emits an ON signal when turned on, and the plurality of humidity detecting portions S emit accumulated ON signals when turned on. For example, the ON signal is a beep, and when only one humidity detecting portion S is turned on, one beep sound is made within unit time; when two humidity detecting portions S are turned on, two beep sounds are made within unit time; and when N humidity detecting portions S are turned on, N beep sounds are made within unit time. Or, when one humidity detecting portion S is turned on, beep sound of unit strength is made, and when N humidity detecting portions S are turned on, beep sound of N* unit strength is made. The ON signal may also be an optical signal that is transmitted to the reminder signal light at the terminal. The amount of conduction of humidity detecting portion S characterizes the amount of liquid and the range of humidity diffusion.

Each coating wire connects at least one electrodes of a humidity detecting portion S. When a plurality of humidity detecting portions S are connected to the same coating wire, the electrochemical medium of the humidity detecting portion S that is not wetted by the liquid is an insulator, and current exists only on the existing coating wire. The wire connected to another electrode of the humidity detecting portion S that is not wetted by the liquid will not form a loop with the existing coating wire. Therefore, setting a plurality of humidity detecting portions S on a coating wire will not cause signal interference and will save the area of the substrate.

All patents and publications mentioned in the specification herein are disclosures of the prior art and they can be used in the present invention. All patents and publications referred to herein are incorporated in the references as if each individual publication is specifically referred to separately. The invention described herein may be practiced in the absence of any one or more of the elements, any one limitation or more limitations that are not specifically recited herein. For example, the terms "comprising," "consisting essentially of," and "consisting of" in each instance herein may be replaced with each of the remaining two terms. The terms and expressions which have been employed herein are descriptive rather than restrictive, and there is no intention to suggest that these terms and expressions in this description exclude any equivalents, but it is to be understood that any appropriate changes or modifications can be made within the scope of the present invention and appended claims. It should be appreciated that, the embodiments described in the present invention are some preferred embodiments and features, and any person skilled in the art may make some changes and variations based on the essence of the description of the present invention, and these changes and variations are also considered to fall into the scope of the present invention and the independent claims and the appended claims.

The invention claimed is:

1. A humidity sensor, comprising:
a non-electrically conductive substrate having a coating wire and at least one humidity detecting portion S, each humidity detecting portion S comprises at least two electrodes, and each of the electrodes is connected to their respective coating wires, wherein an electrochemical medium which is electrically insulated when dry and is conductive when wet is provided between the two electrodes, and
wherein the humidity detecting portion S further comprises a moisture absorbing hole that is disposed between the two electrodes; two electrically conductive carbon adhesive layers covering the two electrodes separately so that the two electrodes are spaced apart from each other across the two carbon adhesive layers, and the electrochemical medium is filled in the moisture absorbing hole; and wherein the electrochemical medium comprises a packing portion and a span portion, the packing portion is packed in the moisture absorbing hole and is adjacent to one side of the two carbon adhesive layers, the span portion extends on the carbon adhesive layer while spanning two carbon adhesive layers and being adjacent to the other side of two carbon adhesive layers.

2. The humidity sensor according to claim 1, wherein there is a plurality of humidity detecting portions and each humidity detecting portion S emits an ON signal when turned on, and the plurality of humidity detecting portions emit accumulated ON signals when turned on.

3. The humidity sensor according to claim 2, wherein the plurality of humidity detecting portions are disposed at different positions of the substrate.

4. The humidity sensor according to claim 1, wherein each coating wire is connected to at least one electrolyte of a humidity detecting portion S.

5. The humidity sensor according to claim 1, wherein the substrate is a water-absorbent or hygroscopic material.

6. The humidity sensor according to claim 1, wherein the substrate is a strip-shaped absorbent paper of equal width, and the humidity detecting portion S is spaced apart along the longitudinal direction of the substrate.

7. The humidity sensor according to claim 1, wherein the substrate comprises a detection section and a signal connection section, the humidity detection portion is disposed at the detection section, the signal input terminal is disposed at the signal connection section, and the detection section and the signal connection section have formed an angle; or the detection section is orthogonal to the signal connection section.

8. The humidity sensor according to claim 1, wherein a positioning hole is disposed on the substrate and the positioning hole is offset from the coating wire and the humidity detecting portion.

9. The humidity sensor according to claim 1, wherein the front side of the substrate is provided with a coating wire, and the back of the substrate is printed with a pattern, the pattern being printed with a material that exhibits color in case of water.

10. The humidity sensor according to claim 1, wherein the conductivity of the substance portion having the electrochemical medium is greater than the conductivity of the substrate when the substrate is wetted.

11. The humidity sensor according to claim 1, wherein the substrate comprises a first portion having a coating wire and a second portion having a chemical medium, wherein the first portion does not include a chemical medium.

12. The humidity sensor according to claim 11, wherein no conduction of current occurs between the coating wires when the first portion is wet.

13. The humidity sensor according to claim 11, wherein the time when the second portion is turned on to generate a current that flows is earlier than the time when a current that flows is generated between first portion coating wires when the first portion and the second portion are both wetted.

14. The humidity sensor according to claim 1, wherein the substrate has a portion with an electrochemical medium and a portion without an electrochemical medium, wherein the conductivity of the portion without an electrochemical medium is less than the conductivity of the portion with an electrochemical medium when the substrate is wetted.

15. The humidity sensor according to claim 1, wherein the substrate has a portion with an electrochemical medium and a portion without an electrochemical medium, wherein the portion without an electrochemical medium is not electrically conductive to generate current and the portion with an electrochemical medium is electrically conductive to generate current when the substrate is wetted.

16. The humidity sensor according to claim 1, wherein the substrate has a portion with an electrochemical medium and a portion without an electrochemical medium, wherein the conductivity of the portion without an electrochemical medium is equal to the conductivity of the portion with an electrochemical medium when the substrate is dry.

17. The humidity sensor according to claim 1, wherein the substrate is an insulator.

18. The humidity sensor according to claim 1, wherein the coating is a carbon coating.

19. The humidity sensor according to claim 1, wherein the coating is a carbon coating; and/or the material of the electrode is carbon electrode.

20. The humidity sensor according to claim 1, wherein the electrochemical medium comprises a hydrophilic polymer containing at least one polar or charged functional group.

* * * * *